June 1, 1965
R. BRACKETT
3,187,085
HUB FOR METER SOCKETS AND THE LIKE, SAID HUB SIZED TO
INTERNALLY ACCEPT ONE SIZE OF CONDUIT AND EXTERNALLY
ACCEPT ANOTHER SIZE CONDUIT AND HAVING
AN ECCENTRIC WALL THICKNESS
Filed Feb. 21, 1962
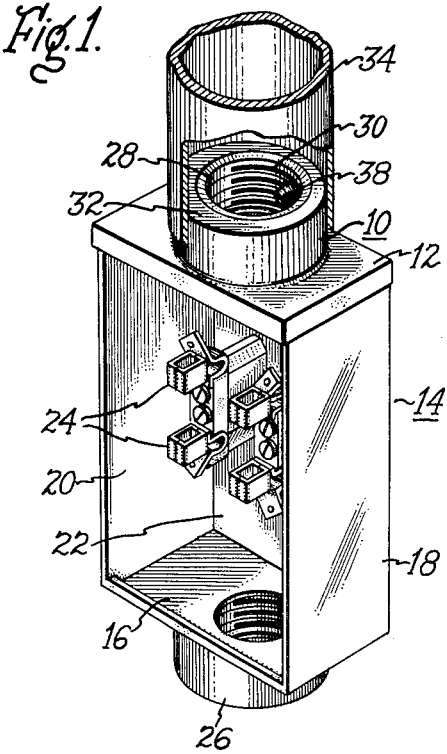
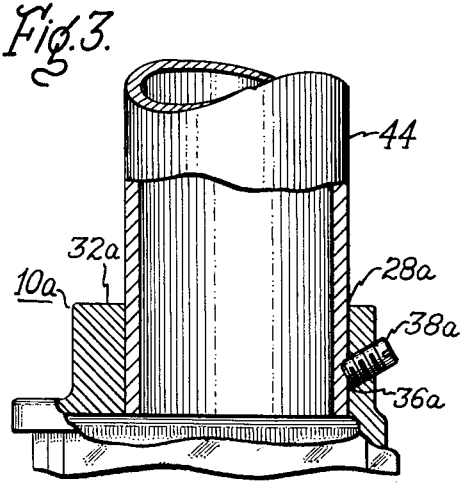
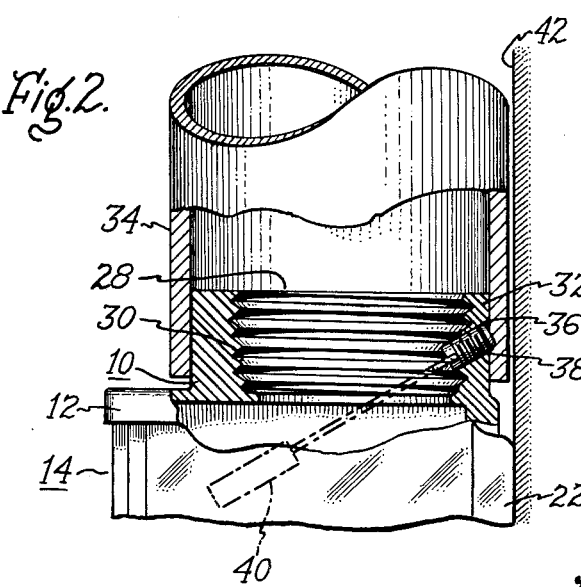
Inventor,
Robert Brackett,
by Francis K. Doyle
His Attorney 3,187,085
HUB FOR METER SOCKETS AND THE LIKE, SAID HUB SIZED TO INTERNALLY ACCEPT ONE SIZE OF CONDUIT AND EXTERNALLY ACCEPT ANOTHER SIZE CONDUIT AND HAVING AN ECCENTRIC WALL THICKNESS
Robert Brackett, Westboro, Mass., assignor to General Electric Company, a corporation of New York
Filed Feb. 21, 1962, Ser. No. 174,862
4 Claims. (Cl. 174—65)

This invention relates to meter sockets, and the like, and more particularly, to a novel hub for meter sockets and the like.

In the electrical wiring field it is well known that various types of metallic enclosures, such as meter sockets, junction boxes, fuse boxes and the like, are utilized to provide various well-known electrical functions in a wiring system. In general, the metallic enclosures are provided with a hub on the top, and in many instances on the bottom, of a metallic enclosure, for the reception of a rigid metallic conduit or pipe which is used to enclose the electrical wires to prevent them from being damaged. Many of the metallic enclosures for example, meter sockets, are installed in outdoor locations, where they are subjected to the climatical variations of the particular locale. In other instances, the metallic enclosures are installed in basements, walls, and other areas, where they are subjected to moisture and other means of condensation. Thus, it is generally considered necessary that the hub of the metallic enclosure and the metallic conduit be connected by means of a water-tight connection. Further, since the conduit, in general, is grounded for safety reasons it is desirable to have a good electrical connection between the hub of the metallic enclosure and the conduit. To obtain the desired water-tight and electrical connection the usual practice is to thread the inside of the hub such that a particular size of threaded conduit may be attached thereto forming a water-tight connection and a good electrical bond between the metallic conduit and the hub of the metallic enclosure.

One problem which has been found in the present day electrical wiring field is that each of the metallic enclosures can be only used with a given size of conduit due to the particular size of the hub provided with such metallic enclosures. Thus where a particular construction requires the use of a 1¼ inch conduit for example, it is clearly necessary that the various metallic enclosures, such as, meter sockets, fuse boxes, junction boxes and the like, must be provided with hubs of the proper size to accept such 1¼ inch conduit. Clearly, if the construction requires the use of 2 inch conduit then the hubs of the various metallic enclosures will of necessity be required to be of the particular size to accept the 2 inch conduit. From this it is clear that utilities and electrical contractors must necessarily maintain a large quantity of metallic enclosures of varying sizes so that they will be available to meet the requirements of the various types of construction.

Clearly it is desirable to provide a more limited number of metallic enclosures in the utility and electrical contractors stock in order to lessen the capital investment required in the inventory. However, to do this it is necessary that the various metallic enclosures must be designed such that the hubs will be able to function with conduits of more than one size. It will be understood that regardless of the size of the conduit, it is also necessary that provisions be made for water-tight connections between the conduit and the hubs, and also to enable a good electrical connection to be made between the hub and the conduit.

Therefore, it is one object of this invention to provide a hub for metallic enclosures which will function with more than one size of conduit.

A further object of this invention is to provide a hub for metallic enclosures in which different sizes of conduit may be connected thereto in a water-tight manner.

A still further object of this invention is to provide a hub for metallic enclosures, such as meter sockets, junction boxes, fuse boxes and the like, which can be connected to two different sizes of metallic conduit, and in which novel means are provided for forming an electrical and water-tight connection with at least one of the sizes of conduit.

Briefly, this invention in one form comprises a metallic enclosure suitable for use as a meter box, fuse box, junction box and the like, which is provided with a hub on at least one wall thereof for connection to a metallic conduit. The interior of the hub may be provided with threads and is sized to accept a standard size of conduit. The thickness of the wall of the hub is selected such that the outside diameter of the hub will snugly fit within another standard size conduit. A threaded opening is provided in the wall of the hub and a set screw is mounted therein. The set screw may be firmly tightened against the wall of the conduit mounted on the hub to provide a water-tight, electrically secure connection between the conduit and the hub.

The invention which is sought to be protected will be particularly pointed out and distinctly claimed in the claims appended hereto. However, it is believed that this invention, and the manner in which its objects and advantages are obtained, as well as other objects and advantages thereof, will be better understood from the following detailed description of a preferred embodiment thereof when considered in the light of the accompanying drawing, in which:

FIGURE 1 is a perspective view, partly in section, of a preferred form of this invention shown in conjunction with a metallic enclosure such as a meter socket;

FIGURE 2 is a partial sectional view of a portion of a metallic box showing the preferred form of the invention in greater detail; and FIGURE 3 is a partial sectional view of a portion of a metallic box showing a modified form of the invention.

Referring now to the drawing, in which like numerals are used to indicate like parts throughout the various views thereof, this invention in a preferred form thereof is shown as a hub 10 formed as part of an upper wall 12 of a metallic box-like enclosure 14 which may be a meter socket, a junction box, a fuse box or the like, a meter socket being illustrated for purposes of the disclosure. While the metallic enclosure 14 is shown in the form of a rectangular box, it will be understood, that the particular shape of the enclosure 14 is immaterial, and that it may be round, square, or any other desired shape. As shown in the preferred embodiment, the enclosure 14 is in the form of a meter socket having end walls 12 and 16, and side walls 18 and 20, and a rear wall 22. Mounted on rear wall 22 are the various terminal jaws 24, which are utilized to accept the terminal blades of a meter socket in a well known manner. Of course, as will be understood, a removable front cover is provided (not shown) in the usual manner, generally having an opening therein through which the exterior portion of the meter protrudes. On the bottom wall 16 of the meter socket 14 a second hub 26 is provided which may be identical with the hub 10 on the upper wall 12, or may be the standard hub which is presently used in metallic enclosure construction.

While the following description will be in detail with respect to the upper hub 10, it is to be understood that the other hub 26 of the metallic enclosure 14 may be identical thereto, if desired. Referring now to hub 10, it may be seen that the hub is provided with an internal opening 28, such opening being provided with the internal threads 30 for the reception of a threaded conduit, in a manner well understood. The thickness of the wall 32 of the hub 10 is so selected such that the external diameter of the hub 10 will be of a size to fit snugly within a standard size conduit. For example, considering hub 10 of FIG. 1, and assuming that the interior threads of the hub 10 are sized with the internal diameter of hub 10 to receive in threaded contact therewith a 1¼ inch diameter conduit, by proper selection of the thickness of the wall 32 the external diameter of the hub 10 may be sized to snugly fit within a 2 inch diameter conduit. For example, the conduit 34, as shown, fits snugly over the outside diameter of the hub 10. Thus it can be seen that by the proper selection of the wall thickness 32 the hub 10 may be designed to be utilized with two separate sizes of conduit; the smaller conduit making a threaded connection with the threads 30 on the interior of the hub while the larger conduit will have a sliding fit with the exterior of the hub 10.

As will clearly be understood by those skilled in the art, 2 inch conduit is frequently used for its structural strength on low-roof houses and the like, to elevate the electrical wires from a utility pole to the house in order that sufficient clearance to the ground is maintained. Therefore, the restricted opening in the hub for 1¼ inch conduit still provides ample space for wire sizes required for 100 ampere electrical service.

Referring now to FIG. 2 of the drawing, it can be seen that a threaded opening 36 is provided on the wall 32 of the hub 10. Into this opening a set screw 38 is inserted making a threaded connection with the opening 36. As can be seen from FIG. 2, the set screw 38 may be tightened within the opening 36 to make a firm connection with the interior of the conduit 34, thus firmly mechanically and electrically securing the conduit 34 to the hub 10. As can be seen from FIG. 2, the set screw 38 is inserted at an angle such that the set screw may be tightened from the opening of the box, such as, for example, by a screwdriver 40 indicated in phantom lines in FIG. 2. Thus, by means of the invention herein, a metallic enclosure may be provided with a hub which is so dimensioned that the internal diameter of the hub may be utilized to function with one standard size of electrical conduit, while the exterior diameter of the hub may be utilized to function with a second standard size of conduit. Of course, it will be obvious that the connection of the conduit 34 fitting over the top of the hub 10 will provide a secure, water-tight connection, and that the set screw 38 will provide a secure, mechanical and electrical bond between the hub 10 and the conduit 34.

A second feature of the invention, which is clearly shown in FIG. 2, is the provision of an eccentric outside diameter of the hub 10 with reference to the inside diameter of the hub 10. As can be seen from FIG. 2, by making the wall 32 of the hub 10 vary in thickness, having the back portion of the wall thinner than the front portion of the wall, as shown clearly in FIG. 2, an additional advantage may be obtained from the use of the dual-sized hub of this invention. As is well known, when conduit is installed on the outside or inside of a structure in electrical construction, it is desired that the conduit be secured to a surface, for example, the wall indicated at 42 in FIG. 2. To provide a neat, rigid construction the hub exterior diameter is eccentric with reference to the interior diameter. With this construction, it can be seen that the conduit may fit snugly over the hub 10 and in the plane of the back wall 22 of the metallic enclosure 14. Thus the conduit 34 will fit against the wall 42 on which the metallic enclosure 14 is mounted and may be easily secured thereto by pipe clamps or the like, in the manner well understood by those skilled in this art.

Some electrical inspectors might object to the sharp edges of the internal threads 30 when the hub is used to mount a conduit or pipe on the exterior thereof. To overcome such objections, and still provide the advantages of a hub useable with two separate sizes of conduit, the modification shown in FIG. 3, may be used. In FIG. 3, the hub 10a has an internal opening 28a, which has smooth walls, rather than internal threads. The opening 28a is sized to snugly receive one size of conduit 44, as shown. For example, this conduit may be 1¼ inch conduit. Wall thickness 32a is again selected, so that the exterior diameter of hub 10a will snugly fit within another size conduit, for example, a 2 inch conduit. The threaded opening 36a in the wall 32a of the hub 10a is similar to that shown in FIGS. 1 and 2. Obviously, when a conduit, such as 44 is mounted on the interior of hub 10a, the set screw 38a will be secured to the conduit from the outside of the hub, as shown in FIG. 3. However, if a conduit, such as 34, is mounted on the exterior of the hub, then the set screw 38a will be secured from the inside of the hub, as shown in FIGS. 1 and 2. By means of this modification, it is possible to provide a hub which will be useable with either of two sizes of conduits, while at the same time eliminating any possible objection to internal threads, when a conduit is mounted on the outside of the hub. Of course, the exterior diameter of hub 10a may be made eccentric with reference to the interior diameter to allow the exteriorly mounted conduit to fit in the plane of the wall, as explained with reference to FIG. 2.

From the above description of the preferred embodiment of this invention it is believed that those skilled in this art will readily understand the utility of the novel hub herein disclosed. It will, of course, be understood, that various changes may be made in the constructional details of this invention without departing from the spirit of the invention hereinbefore set forth. Therefore, while there has been shown and described particular preferred embodiments of the invention, it will be obvious to those skilled in the art that various changes and modifications may be made without departing from the spirit and scope of the invention as set forth in the claims appended hereto.

What is claimed as new and which it is desired to secure by Letters Patent of the United States is:

1. A metallic enclosure comprising a rear wall, a second wall perpendicular to said rear wall, at least one hub formed as part of said second wall, said hub having an opening therein sized to receive a standard size conduit, said hub having an eccentric wall thickness, the outside diameter of said hub being eccentric with reference to said inside diameter of said hub, said wall thickness being selected such that the outside diameter of said hub will fit snugly within a second standard size conduit, said hub being formed on said second wall such that a conduit fitting over said hub will have a portion of its outside circumference falling within the plane of said rear wall of said metallic enclosure.

2. A metallic enclosure as set forth in claim 1 in which the wall of said hub is provided with a threaded opening, a set screw mounted within said threaded opening for mechanically and electrically securing a conduit to said hub.

3. A metallic enclosure as set forth in claim 1 in which said opening in said hub sized to receive a standard size conduit is provided with internal threads to make a threaded connection to a conduit fitting therewithin.

4. A metallic enclosure as set forth in claim 3 in which a wall of said hub is provided with a threaded opening, a set screw mounted within said threaded opening for mechanically and electrically securing a conduit to the outside diameter of said hub.

(References on following page)

References Cited by the Examiner

UNITED STATES PATENTS

| | | | |
|---|---|---|---|
| 1,000,043 | 8/11 | Scism | 285—161 X |
| 1,736,097 | 11/29 | Schickluna | 220—3.3 |
| 1,831,856 | 11/31 | Fullman | 285—161 X |
| 2,836,437 | 5/58 | Wayman | 285—158 |
| 2,926,212 | 2/60 | Appleton | 174—81 |
| 2,972,656 | 2/61 | Fisher | 174—52 X |
| 3,139,480 | 6/64 | Desloge | 174—65 |

FOREIGN PATENTS 1,079,433  11/54  France.

LARAMIE E. ASKIN, *Primary Examiner.*

JOHN P. WILDMAN, JOHN F. BURNS, E. JAMES SAX, *Examiners.*